UNITED STATES PATENT OFFICE 2,100,827

PROCESS FOR THE PRODUCTION OF POTASSIUM FORMATE

Erich Wiedbrauck, Essen-Ruhr, Germany, assignor to Chemische Fabrik Buckau, Ammendorf, (Saalkreis) Germany No Drawing. Application January 29, 1936, Serial No. 61,427. In Germany January 31, 1935

18 Claims. (Cl. 260—118)

This invention relates to a process for the production of potassium formate.

In the production of potassium formate from potassium sulphate and calcium formate, or from potassium sulphate, milk of lime and carbon monoxide (or gases containing same), as raw materials, it is difficult to conduct the reaction in such a manner as to obtain a concentrated solution of potassium formate and calcium sulphate free from potassium, in a single working operation. Depending on the method adopted, a more or less extensive portion of the valuable potassium passes, at first, into the sediment, in the form of syngenite ($CaSO_4 \cdot K_2SO_4$) or pentasulphate ($5CaSO_4 \cdot K_2SO_4$), and has to be separated from the sediment by special treatment. In fact, in certain of the known processes, operations are specially directed to the formation of the potassium bearing sediment, the difficult treatment of which is accepted as a necessary evil.

Processes are also known in which attempts are made to minimize the formation of this sediment, by performing the decomposition in autoclaves, and at the decomposition temperature of the double salt. Such processes, however, require temperatures exceeding 200° C. and positive pressures of over 35 atmospheres.

It is the aim of the present invention to avoid the said drawbacks of the known processes and to produce a potassium formate solution of maximum purity and a concentration exceeding 20%, together with a calcium sulphate that is free from potassium, directly from the raw materials, potassium sulphate and calcium formate, or milk of lime and carbon monoxide (or gases containing this latter).

It has been ascertained in accordance with the present invention that the precipitated calcium sulphate can easily be recovered, free from potassium, if the concentration of the potassium sulphate in the reaction solution be kept as low as possible at the moment of reaction and care be taken to ensure rapid conversion of all participants in the reaction. In addition the present process has the advantage that the formate reaction can be conducted at temperatures below 200° C.—for example 180–190° C.—and under corresponding autogenous pressures of about 20 atmospheres. Moreover, a high through-put can be obtained in the apparatus especially since the process can be suitably rendered continuous.

A preferred method of carrying the process into practical effect consists in pumping a mixture of milk of lime and potassium sulphate into a mixture of potassium formate and calcium sulphate that has already been in reaction, the introduction being effected at elevated temperature and under pressure, this flowing reaction mixture being well stirred and brought into contact with a counterflow current of carbon monoxide, or gases containing the same. The reaction conditions, such as temperature, pressure, rate of flow of the gases and liquid, degree of agitation and so forth, are now controlled in such a manner that only the smallest possible excess of potassium sulphate is present at the moment of reaction. The process may also be performed in a semi-continuous manner by merely passing the potassium sulphate under pressure and in proportion as it is consumed, into a hot solution of calcium formate, which may also have just been formed from its raw materials.

In this manner, operating continuously, it is easy to produce a potassium formate solution containing 200–300 grms. per litre, with a conversion of over 90% of the potassium sulphate, and over 98% of the carbon monoxide. The loss of potassium in the calcium sulphate residue is less than 1%. The washing water containing potassium formate may be returned directly into the process. The resulting calcium sulphate is easily filtered. The reaction can be continuously performed in efficient stirrer autoclaves, reaction towers provided with suitable distributors and so forth, the rapidity of the reaction giving high through-put values.

Example I

A battery of several superimposed autoclaves, equipped with efficient stirring mechanism and connected together by overflow pipes, is employed, and producer gas containing 30–32% by volume of carbon monoxide (the remainder being nitrogen and steam), is blown into the lowest autoclave. The top autoclave is continuously supplied with an aqueous mixture of about 90 grms. of lime and 280 grms. of potassium sulphate per litre, preferably preheated to about 150° C. The counterflowing liquid and gas, at 180–200° C. under a positive pressure of 20–30 atmospheres, are so controlled that the effluent gas mixture contains only a few tenths per cent of carbon monoxide. The finished reaction solution is continuously discharged, under pressure, from the bottom autoclave, and, after the pressure has been relieved, is filtered hot. The resulting calcium sulphate is practically free from potassium, whilst the clear reaction solution contains about 250 grms. of potassium formate per litre.

Example II

Milk of lime, containing about 120 grms. of CaO per litre is charged into an autoclave, and carbon monoxide, or producer gas, is introduced at 190° C. and under 20 atmospheres positive pressure, so that calcium formate is produced. A concentrated solution and suspension of potassium sulphate preheated to about 150° C., is added continuously, an excess of calcium formate being maintained until the reaction has terminated, whereupon a potassium formate solution containing about 250 grms. per litre is obtained. The resulting calcium sulphate is practically free from potassium.

What I claim is:

1. In the process of manufacturing potassium formate wherein calcium formate is reacted in aqueous solution with potassium sulphate at elevated temperatures not substantially below 180° C. and under corresponding superatmospheric pressures, the step which comprises maintaining the concentration of the potassium sulphate in the reaction mixture as low as possible at the moment of reaction by adding the potassium sulphate substantially as it is converted.

2. The process of claim 1, in which the conversion is effected at a temperature of about 180° to about 200° C. and at a pressure of about 20 to about 30 atmospheres.

3. The process of claim 1, in which the conversion is accelerated by preheating the reaction components prior to their reaction to temperatures approaching the temperature of the reaction mixture.

4. In the manufacture of potassium formate, the process which comprises reacting calcium formate with potassium sulphate in aqueous solution at a temperature of about 180° to about 200° C. and at a pressure of about 20 to about 30 atmospheres while maintaining the concentration of the potassium sulphate in the reaction mixture as low as possible at the moment of reaction by adding the potassium sulphate substantially as it is converted and accelerating the conversion by preheating the reaction components prior to said reaction.

5. In the manufacture of potassium formate, the continuous process which comprises reacting together in aqueous solution calcium formate, milk of lime, carbon monoxide and potassium sulphate at temperatures of the order of 180° to 200° C. and under corresponding autogenous pressures while maintaining the concentration of the potassium sulphate in the reaction zone as low as possible at the moment of reaction by adding the potassium sulphate at a rate substantially equal to its rate of conversion.

6. The process of claim 5 in which the conversion is effected at a temperature of about 180° to about 200° C. and at a pressure of about 20 to about 30 atmospheres.

7. The process of claim 5 in which the conversion is accelerated by preheating the reaction components prior to their reaction to temperatures approaching the temperature of the reaction zone.

8. In the manufacture of potassium formate, the process which comprises reacting the originating components of calcium formate, that is milk of lime and carbon monoxide, with potassium sulphate in aqueous solution at a temperature of about 180° to about 200° C. and at a pressure of about 20 to about 30 atmospheres while maintaining the concentration of the potassium sulphate in the reaction mixture as low as possible at the moment of reaction by adding the potassium sulphate substantially as it is converted and accelerating the conversion by preheating the reaction components prior to their reaction.

9. In the manufacture of potassium formate, the process which comprises reacting the originating components of calcium formate, that is milk of lime and carbon monoxide containing gases, with potassium sulphate in aqueous solution at temperatures not substantially below 180° C.; and under corresponding autogenous pressures while maintaining the concentration of the potassium sulphate in the reaction mixture as low as possible at the moment of reaction by adding the potassium sulphate substantially as it is converted.

10. The process of claim 9 in which the conversion is effected at a temperature of about 180° to about 200° C. and at a pressure of about 20 to about 30 atmospheres.

11. The process of claim 9 in which the conversion is accelerated by preheating the reaction components prior to their reaction to temperatures approaching the temperature of the reaction zone.

12. In the manufacture of potassium formate, the process which comprises reacting the originating components of calcium formate, that is milk of lime and carbon monoxide containing gases, with potassium sulphate in aqueous solution at a temperature of about 180° to about 200° C. and at a pressure of about 20 to about 30 atmospheres while maintaining the concentration of the potassium sulphate in the reaction mixture as low as possible at the moment of reaction by adding the potassium sulphate substantially as it is converted and accelerating the conversion by preheating the reaction components prior to their reaction.

13. In the manufacture of potassium formate, the process which comprises reacting the originating components of calcium formate, that is milk of lime and gases comprising carbon monoxide, with potassium sulphate in aqueous solution at temperatures not substantially below 180° C. and under corresponding autogenous pressures while maintaining the concentration of the potassium sulphate in the reaction mixture as low as possible at the moment of the reaction by passing a flowing reaction mixture of milk of lime and potassium sulphate into contact with a continuous counterflow current of the said gases.

14. The process of claim 13 in which the conversion is effected at a temperature of about 180° to about 200° C. and at a pressure of about 20 to about 30 atmospheres.

15. The process of claim 13 in which the conversion is accelerated by preheating the reaction components prior to their reaction to temperatures approaching the temperature of the reaction mixture.

16. In the manufacture of potassium formate, the process which comprises reacting the originating components of calcium formate, that is milk of lime and gases comprising carbon monoxide, with potassium sulphate in aqueous solution at a temperature of about 180° to about 200° C. and at a pressure of about 20 to about 30 atmospheres while maintaining the concentration of the potassium sulphate in the reaction mixture as low as possible at the moment of the reaction by bringing a flowing reaction mixture of milk of lime and potassium sulphate into contact with a continuous counterflow current of the said gases and accelerating the conversion by preheating the reaction components prior to the reaction.

17. In the process of manufacturing potassium formate wherein an aqueous solution containing calcium formate is reacted with potassium sulphate at elevated temperatures not substantially below 180° C. and under corresponding superatmospheric pressures, the steps which comprise maintaining the concentration of the potassium sulphate in the reaction zone at a minimum value consistent with a reasonable rate of reaction and maintaining the calcium formate in excess in the reaction zone until the reaction is completed.

18. In the manufacture of potassium formate, the process which comprises establishing and maintaining a heated reaction zone in which a reaction takes place at temperatures not substantially below 180° C., between calcium hydroxide, carbon monoxide and potassium sulphate, continuously adding a solution containing milk of lime and potassium sulphate at the top of said reaction zone, continuously adding carbon monoxide-containing gases at the bottom of said zone, withdrawing gaseous products at the top, and liquids and solids at the bottom of said zone, and so controlling the addition of the reacting components that the exit gases are substantially free from carbon monoxide and the solids are substantially free from potassium.

ERICH WIEDBRAUCK.